United States Patent [19]

Carlson et al.

[11] Patent Number: 4,683,117
[45] Date of Patent: Jul. 28, 1987

[54] NUCLEAR FUEL ASSEMBLY INCORPORATING PRIMARY AND SECONDARY STRUCTURAL SUPPORT MEMBERS

[75] Inventors: William R. Carlson, Pittsburgh; Robert K. Gjertsen, Monroeville; John V. Miller, Munhall, all of Pa.

[73] Assignee: Westinghouse Electric Corp., Pittsburgh, Pa.

[21] Appl. No.: 774,126

[22] Filed: Sep. 9, 1985

[51] Int. Cl.[4] .............................................. G21C 3/32
[52] U.S. Cl. .................................... 376/449; 376/438; 376/445; 376/446; 376/447; 376/448
[58] Field of Search ............... 376/438, 445, 446, 447, 376/449, 448

[56] References Cited

U.S. PATENT DOCUMENTS

| | | | |
|---|---|---|---|
| 3,791,466 | 2/1974 | Patterson | 376/447 |
| 3,801,453 | 4/1974 | Jones | 376/447 |
| 4,302,294 | 11/1981 | Leelescq | 376/446 |
| 4,534,933 | 8/1985 | Gjertsen | 376/362 |

*Primary Examiner*—Donald P. Walsh

[57] ABSTRACT

A fuel assembly includes top and bottom nozzles, elongated hollow control rod guide thimbles extending longitudinally between and rigidly interconnecting the top and bottom nozzles such that together they form a rigid structural skeleton of the fuel assembly, transverse grids being supported on the guide thimbles at axially spaced locations therealong between the top and bottom nozzles, fuel rods extending through and being supported by the grids between the top and bottom nozzles so as to extend in generally side-by-side spaced relation to one another and to the guide thimbles, and elongated solid tie rods extending longitudinally between the top and bottom nozzles and through and rigidly interconnected with the grids so as to extend in generally side-by-side spaced relation to one another, to the fuel rods and to the guide thimbles so as to bolster the stiffness of the structural skeleton of the fuel assembly. Each of the guide thimbles has a cross-sectional size which occupies a position in the fuel assembly substantially equivalent to the positions of more than one of the fuel rods, whereas each of the tie rods has a cross-sectional size which occupies a position in the fuel assembly substantially equivalent to the position of only one of the fuel rods. While each guide thimble has a cross-sectional size which is larger than the cross-sectional size of each tie rods, the cross-sectional area of the tie rod is substantially equal to the cross-sectional area of the guide thimble.

12 Claims, 5 Drawing Figures

NUCLEAR FUEL ASSEMBLY INCORPORATING PRIMARY AND SECONDARY STRUCTURAL SUPPORT MEMBERS

BACKGROUND OF THE INVENTION

1. Field of the Invention

The present invention relates generally to fuel assemblies for nuclear reactors and, more particularly, is concerned with a modified fuel assembly skeletal structure incorporating a combination of primary and secondary longitudinal structural support members tailored to meet mechanical strength requirements for the fuel assembly and designed for use where the moderator control function of the fuel assembly has been eliminated.

2. Description of the Prior Art

A typical pressurized water nuclear reactor (PWR) contains a large number of fuel assemblies in its core. The fuel enrichment of the fuel assemblies ordinarily varies from one group of assemblies to another depending upon their locations in the reactor core. In order to optimize the fuel burnup and smooth the radial neutron flux profile across the reactor core, historically a zoned enrichment pattern has been used.

Notwithstanding their variation in fuel enrichment, all of the fuel assemblies in the reactor core have the same construction. Basically, each fuel assembly is composed of a bottom nozzle, a top nozzle, an instrumentation tube and pluralities of guide thimbles, fuel rods and support grids. For instance, in one exemplary fuel assembly, the fuel rods are arranged in a square 17 by 17 array with 17 rod locations per side. Of the total possible 289 rod locations per assembly, 264 locations contain fuel rods. In addition to the single bottom nozzle, top nozzle and instrumentation tube, there are 24 guide thimbles and 8 support grids.

The structural skeleton of the fuel assembly is composed of the bottom and top nozzles and the plurality of guide thimbles which extend vertically between the bottom and top nozzles and rigidly interconnect them. In addition to their shared function with the bottom and top nozzles of providing the fuel assembly with a rigid skeleton, the guide thimbles provide channels through the fuel assembly which serve as a means for guiding the insertion of a rod control cluster (RCC) into the fuel assembly. In the standard 17 by 17 fuel assembly, the position of the 24 guide thimbles mirrors the position of the 24 control rods of the RCC.

A more recently-designed advanced PWR fuel assembly employs 16 large guide thimbles instead of the 24 small guide thimbles in the standard PWR fuel assembly. The large guide thimbles of the advanced PWR fuel assembly serve as potential locations not only for the RCC, but also for a gray rod cluster (GRC) or a water displacer rod cluster (WDRC). This latter component, the WDRC, performs the moderator control function in the advanced PWR and can be easily accommodated since only 8 of the 16 guide thimbles are dedicated to the RCC and only then when the fuel assembly is positioned in a "rodded" core location.

It is anticipated that some future uses of the advanced PWR fuel assembly will not include the moderator control function provided by the WDRC. If the design of this fuel assembly is not altered, then each of the fuel assemblies at control or gray rod locations would have 8 empty guide thimbles, while the remaining assemblies at "non-rodded" locations would each have all 16 guide thimbles empty. These empty guide thimbles represent potential "water-hole peaking" locations as well as a loss in fuel rod surface area. Preliminary calculations indicate that the peaking factors at the beginning of a cycle would be 5 to 10 percent greater. Also, loss of fuel rod surface area is especially severe in the advanced PWR fuel assembly where each of the 16 large guide thimbles displace the equivalent of four fuel rod positions. (In the standard PWR fuel assembly having the 24 small guide thimbles, each guide thimble displaces only one fuel rod position.)

Consequently, a need exists for a fresh approach to fuel assembly design which will anticipate future requirements and enhance adaptability of the fuel assembly to them without sacrificing its structural integrity and while avoiding or reducing some of the limitations and shortcomings inherent in the present advanced PWR fuel assembly construction described above.

SUMMARY OF THE PRESENT INVENTION

The present invention provides a modified fuel assembly skeletal structure designed to satisfy the aforementioned needs. The present invention undertakes to improve core margins and make up for fuel rod surface area loss by modifying the skeletal structure of the pre-existing advanced PWR fuel assembly in a way which will allow an increase in the number of fuel rods contained by the modified fuel assembly. The 8 large guide thimbles which were used exclusively before for WDRC locations have been replaced by a combination of fuel rods and small tie rods. The number of tie rods used can vary. Either 4, 8, 12 or 16 tie rods can be used depending on the mechanical strength required for the modified fuel assembly. In the typical arrangement, 8 tie rods are used. The number of fuel rods resulting from this modification is 320, an increase of over eight percent above the previous advanced PWR fuel assembly design. This increase in the number of fuel rods represents additional margin for the reactor core in such areas as DNB (departure from nucleate boiling), PCI (pellet-clad interaction), LOCA (loss of coolant accident), etc. Even with these modifications, the basic geometry of the pre-existing advanced PWR fuel assembly design remains virtually unchanged, while many simplifications can now be made to the reactor design in terms of certain equipment and structures required by the WDRC which can now be eliminated.

Accordingly, the present invention is directed to a fuel assembly, comprising: (a) an upper end structure; (b) a lower end structure; (c) a plurality of elongated primary structural members extending longitudinally between and rigidly interconnecting the upper and lower end structures, the upper and lower ends structures and primary structural members together forming a rigid structural skeleton of the fuel assembly; (d) a plurality of transverse grids being supported on the primary structural members at axially spaced locations therealong between the upper and lower end structures; (e) a plurality of fuel rods extending through and being supported by the grids between the upper and lower end structures so as to extend in generally side-by-side spaced relation to one another and to the primary structural members; and (f) a plurality of elongated secondary structural members extending longitudinally between the upper and lower end structures and through and rigidly interconnected with the grids so as to extend in generally side-by-side spaced relation to one another, to the fuel rods and to the primary structural member so as to bolster the stiffness of the structural skeleton of the fuel assembly.

More particularly, each of the primary structural members is a hollow guide thimble adapted to receive a reactivity controlling rod therein, whereas each of the secondary structural members is a solid tie rod. Each of the guide thimbles has a cross-sectional size which occupies a position in the fuel assembly substantially equivalent to the positions of more than one of the fuel rods, whereas each of the tie rods has a cross-sectional size which occupies a position in the fuel assembly substantially equivalent to the position of only one of the fuel rods. While each guide thimble has a cross-sectional size which is larger than the cross-sectional size of each tie rod, the cross-sectional area of each tie rod is substantially equal to the cross-sectional area of each guide thimble.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which.

DETAILED DESCRIPTION OF THE INVENTION

Figure 1:
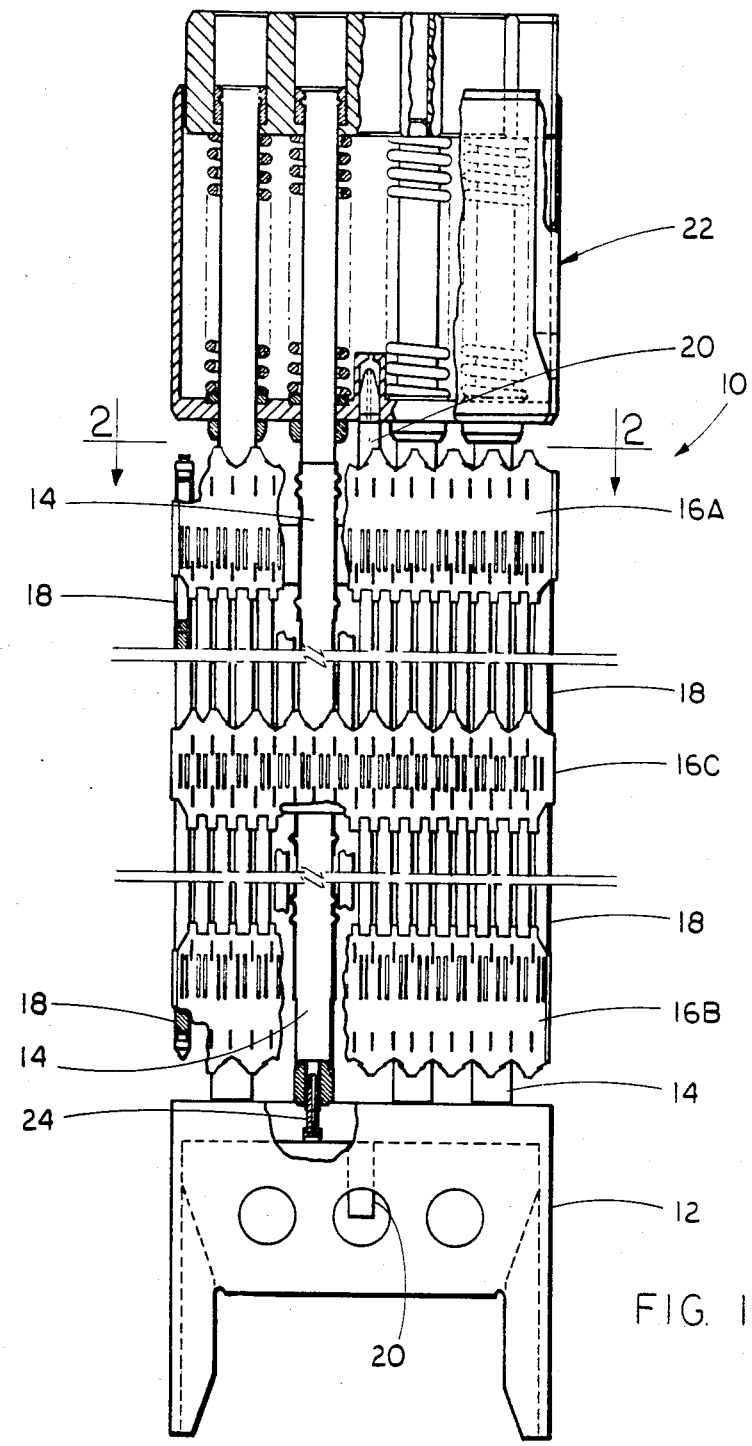
FIG. 1 is an elevational view of the prior art fuel assembly to which the modifications of the present invention can be applied, the fuel assembly being illustrated in vertically foreshortened form, partially sectioned and with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

In General

Referring now to the drawings, and particularly to FIG. 1, there is shown an elevational view of a prior art fuel assembly, represented in vertically foreshortened form and being generally designated by the numeral 10, to which the improved modifications of the present invention can be applied. The fuel assembly 10 is the type used in an advanced version of a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse support grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle with hold-down means incorporated therewithin, generally designated 22, attached to the upper ends of the guide thimbles 14. With such an arrangement of parts, the fuel assembly 10 forms an integral unit capable of being conventionally handled without damaging the assembly parts.

To form the fuel assembly 10, the transverse grids 16 are attached to the longitudinally extending guide thimbles 14 at predetermined axially spaced locations. Next, the fuel rods 18 are inserted from below through the grids 16 and the bottom nozzle 12 is then suitably attached, such as by machine screws 24, to the lower ends of the guide thimbles. Then, the top nozzle 22 is attached to the upper ends of the guide thimbles 14. To control the fission process, a multiplicity of control rods (not shown) are reciprocally movable in the guide thimbles 14 of the fuel assembly 10.

Figure 2:
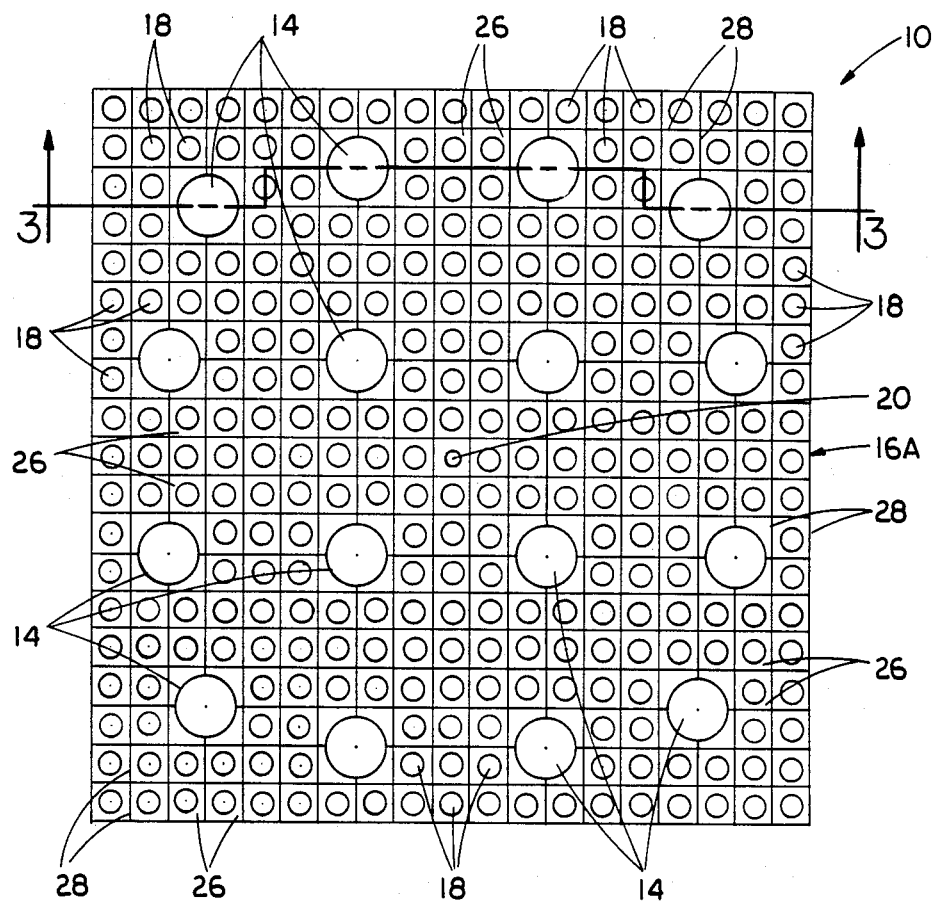
FIG. 2 is an enlarged sectional view taken along line 2—2 of FIG. 1 above the uppermost one of the support grids of the fuel assembly to show the arrangement of the fuel rods and guide thimbles therein.
Figure 3:
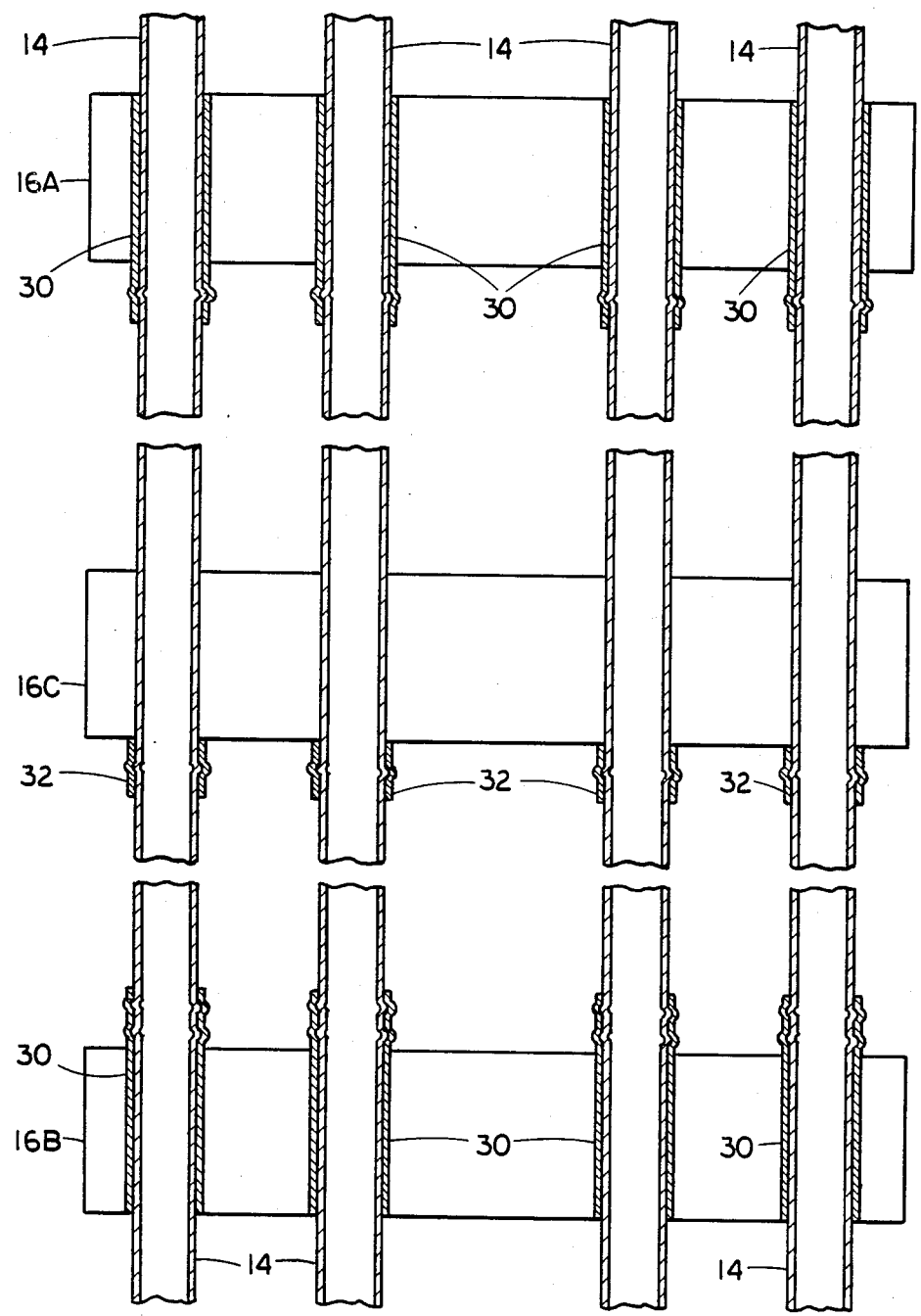
FIG. 3 is a sectional view, on a slightly larger scale, taken along line 3—3 of FIG. 2, in which the fuel rods have been omitted and illustrating the connections of the guide thimbles to the support grids.

A typical arrangement of the fuel rods 18 in the fuel assembly 10 is depicted in FIG. 2. The fuel rods 18 are organized in a 19 by 19 array by the support grids 16 which, in turn, are attached to the guide thimbles 14, as seen in FIG. 3. Each of the sixteen guide thimbles takes up the positions of four fuel rods (and also the position of one fuel rod is occupied by the instrumentation tube 20). Thus, the prior art fuel assembly 10 contains 296 (361 minus 64 minus 1) fuel rods. If eight of the sixteen guide thimbles 14 will not be used in certain anticipated future applications of the fuel assembly 10, then that represents an unnecessary loss of 32 potential fuel rod positions.

The supported grids 16 and the fuel rods 18 are not structural parts of the fuel assembly 10 but instead, as mentioned above, are respectively supported directly and indirectly by the guide thimbles 14. The grids 16 are attached in axially spaced positions along the guide thimbles 14 (only the uppermost grid 16A, lowermost grid 16B and middle grid 16C being seen in FIG. 3) such that the multiplicity of cells 26, being defined by crisscross interleaved straps 28 of each grid 16 and receiving the respective fuel rods 18, such as seen in FIG. 2, are disposed in vertical alignment. Long sleeves 30 (seen in FIG. 3, but not in FIG. 2) are attached, such as by welding, to the uppermost and lowermost grids 16A, 16B, whereas short sleeves 32 (also seen in FIG. 3, but not in FIG. 2) are attached, such as by welding, to the center grid 16C. The sleeves 30,32 are received about the guide thimbles 14 and attached respectively thereto by standard bulged fitted connections. The fuel rods 18 are supported in the organized and transversely spaced array in the vertically aligned cells 26 of the transverse grids 16 by springs (not shown) and dimples (not shown) on the straps 28 which extend into the cells 26.

As clearly shown in FIG. 2, the guide thimbles 14 are much larger in diameter than the fuel rods 18 so as to provide channels adapted to accommodate various types of control rods used in controlling the reactivity of the nuclear fuel in the fuel rods. While the guide thimbles 14 accommodate various types of control rods, fuel rods 18 cannot be placed in them when they are not being otherwise used since the fuel rods would overheat due to lack of enough remaining space within the guide thimble to accommodate sufficient coolant to carry the heat away.

Thus, the conventional fuel assembly has a significant number of its fuel rod locations, approaching eighteen percent in the example above, dedicated to nonfuel use. Since certain future applications envisioned for the fuel assembly 10 will not make use of one-half of the guide thimbles 14, approximately one-half of the nonfuel rod locations 14 will go unused which results in reduced power output, increased fuel cycle cost, reduced fuel assembly life and a suboptimum fuel loading configuration. Also, while the interconnections provided by the guide thimbles provide a rigid skeleton of high structural integrity, the large number of thimbles increases the difficulty of top nozzle removal and remounting in carrying out fuel assembly reconstitution.

Modified Advanced PWR Fuel Assembly

Figure 4:
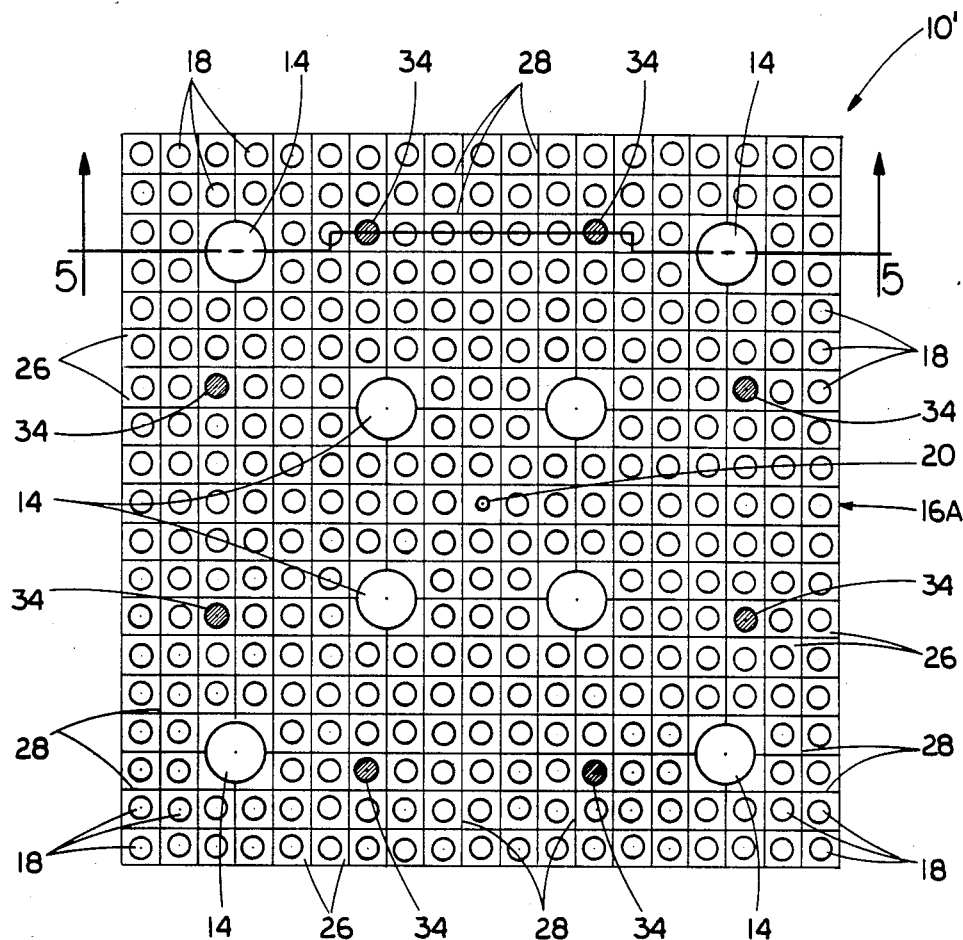
FIG. 4 is a sectional view similar to that of FIG. 2, but now showing the improved modifications provided in the fuel assembly by the present invention.
Figure 5:
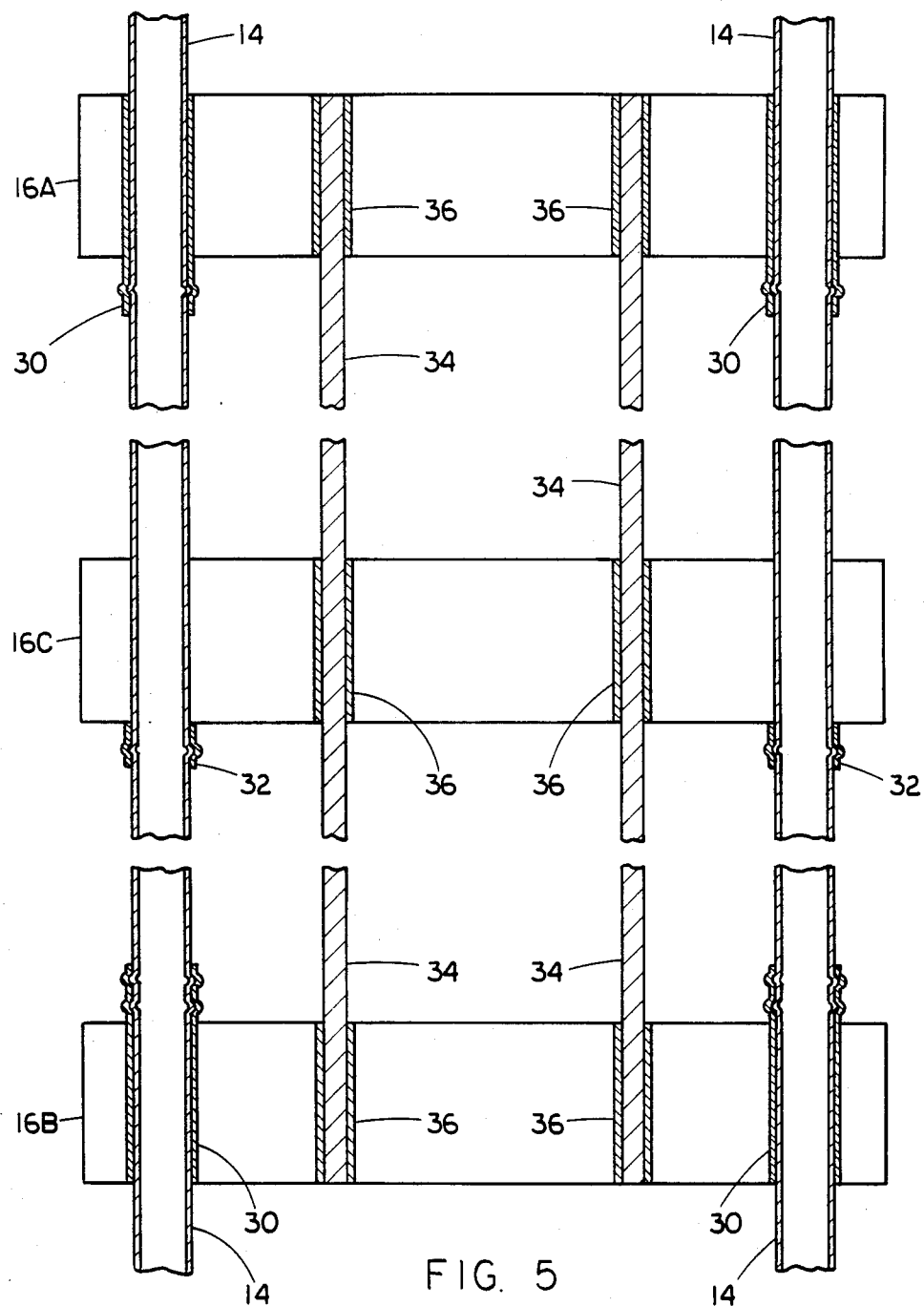
FIG. 5 is a sectional view similar to that of FIG. 3, taken along line 5—5 of FIG. 4, in which the fuel rods have been omitted and illustrating the connections of the guide thimbles and tie rods to the support grids.

Turning to FIGS. 4 and 5, there is shown the modifications incorporated by a fuel assembly 10' being introduced by the present invention which achieve an increase in the amount of nuclear fuel contained in the assembly without undermining its structural integrity. The only difference between the fuel assembly 10 (FIGS. 1-3) and the modified fuel assembly 10' (FIGS. 4 and 5) is that in place of each of the eight guide thimbles 14 not now used, three foul rods 18 and one tie rod 34 are substituted. The remaining hollow guide thimbles 14, in the illustrated embodiment being eight in number and arranged in a diagonal cross-like pattern, together with the top and bottom nozzles 22,12 still form the rigid structural skeleton of the fuel assembly. However, now the hollow guide thimbles 14 represent the primary structural support members of the fuel assembly skeletal structure, whereas the tie rods 34 represent the secondary structural support members thereof.

The eight elongated tie rods 34 extend longitudinally between the top and bottom nozzles 22,12 but are not connected thereto. The tie rods also extend through and rigidly interconnect via sleeves 36 (not shown in FIG. 4) with the grids 16 (only the uppermost, lowermost and center grids 16A,16B,16C being seen in FIG. 5) so as to extend in generally side-by-side spaced relation to one another, to the fuel rods 18 and to the remaining guide thimbles 14 so as to bolster the stiffness of the structural skeleton of the fuel assembly 10'. The sleeves 36 can be welded to the tie rods 34 or bulge fitted into complementary grooves (not shown) which could be formed in the tie rods.

Thus, each guide thimble 14 has a cross-sectional size which occupies a position in the fuel assembly 10' substantially equivalent to the positions of four fuel rods 18, whereas each tie rod 34 has a cross-sectional size which occupies a position substantially equivalent to the position of only one of fuel rods. Whereas each of the tie rods 34 is solid and has a cross-sectional area substantially equal to the cross-sectional area of each hollow guide thimble 14 so as to maintain nuclear balance within the fuel assembly 10', each guide thimble 14 has a cross-sectional size which is much larger than the cross-sectional size of each tie rod 34. The tie rods 34 can be made of solid Zircaloy to reduce neutron absorption, but the use of stainless steel is also possible.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. A nuclear fuel assembly, comprising:
   (a) an upper end structure;
   (b) a lower end structure;
   (c) a plurality of elongated primary structural members extending longitudinally between and rigidly interconnecting said upper and lower end structures, said upper and lower end structures and primary structural members together forming a rigid structural skeleton of said fuel assembly;
   (d) a plurality of transverse grids being supported on said primary structural members at axially spaced locations therealong between said upper and lower end structures;
   (e) a plurality of fuel rods extending through and being supported by said grids between said upper and lower end structures so as to extend in generally side-by-side spaced relation to one another and to said primary structural members; and
   (f) a plurality of elongated secondary structural members extending longitudinally between but unconnected with said upper and lower end structures, said secondary structural members extending through and rigidly interconnected with said grids so as to extend in generally side-by-side spaced relation to one another, to said fuel rods and to said primary structural members so as to bolster the stiffness of said structural skeleton of said fuel assembly.

2. The nuclear fuel assembly as recited in claim 1, wherein each of said primary structural members is hollow and adapted to receive a reactivity controlling rod therein.

3. The nuclear fuel assembly as recited in claim 1, wherein each of said secondary structural members is solid.

4. The nuclear fuel assembly as recited in claim 1, wherein each of said primary structural members has a cross-sectional size which occupies a position in said fuel assembly substantially equivalent to the positions of more than one of said fuel rods, whereas each of said secondary structural members has a cross-sectional size which occupies a position in said fuel assembly substantially equivalent to the position of only one of said fuel rods.

5. The nuclear fuel assembly as recited in claim 1, wherein each of said secondary structural members has a cross-sectional area substantially equal to the cross-sectional area of said primary structural member.

6. The nuclear fuel assembly as recited in claim 5, wherein each of said primary structural members is hollow and adapted to receive a reactivity controlling rod therein.

7. The nuclear fuel assembly as recited in claim 6, wherein each of said secondary structural members is solid.

8. The nuclear fuel assembly as recited in claim 1, wherein each of said primary structural members has a cross-sectional size which is larger than the cross-sectional size of each of said secondary structural member.

9. A nuclear fuel assembly, comprising:
(a) a top nozzle;
(b) a bottom nozzle;
(c) a plurality of elongated hollow control rod guide thimbles extending longitudinally between and rigidly interconnecting said top and bottom nozzles, said top and bottom nozzles and said guide thimbles together forming a rigid structural skeleton of said fuel assembly;
(d) a plurality of transverse grids being supported on said guide thimbles at axially spaced locations therealong between said top and bottom nozzles;
(e) a plurality of fuel rods extending through and being supported by said grids between said top and bottom nozzles so as to extend in generally side-by-side spaced relation to one another and to said guide thimbles; and
(f) a plurality of elongated solid tie rods extending longitudinally between but unconnected with said top and bottom nozzles, said tie rods extending through and rigidly interconnected with said grids so as to extend in generally side-by-side spaced relation to one another, to said fuel rods and to said guide thimbles so as to bolster the stiffness of said structural skeleton of said fuel assembly.

10. The nuclear fuel assembly as recited in claim 9, wherein each of said guide thimbles has a cross-sectional size which occupies a position in said fuel assembly substantially equivalent to the positions of more than one of said fuel rods, whereas each of said tie rods has a cross-sectional size which occupies a position in said fuel assembly substantially equivalent to the position of only one of said fuel rods.

11. The nuclear fuel assembly as recited in claim 9, wherein each of said tie rods has a cross-sectional area substantially equal to the cross-sectional area of said guide thimble.

12. The nuclear fuel assembly as recited in claim 9, wherein each of said guide thimbles has a cross-sectional size which is larger than the cross-sectional size of each of said tie rods.

* * * * *